United States Patent
Angus et al.

(10) Patent No.: US 12,422,562 B2
(45) Date of Patent: Sep. 23, 2025

(54) LIDAR SYSTEM

(71) Applicant: Aurora Operations, Inc., Mountain View, CA (US)

(72) Inventors: Edward Joseph Angus, Bozeman, MT (US); Craig Benko, Bozeman, MT (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 223 days.

(21) Appl. No.: 17/721,114

(22) Filed: Apr. 14, 2022

(65) Prior Publication Data
US 2023/0333255 A1    Oct. 19, 2023

(51) Int. Cl.
| | | |
|---|---|---|
| G01S 17/931 | (2020.01) | |
| B60W 10/18 | (2012.01) | |
| B60W 10/20 | (2006.01) | |
| B60W 50/02 | (2012.01) | |
| B60W 60/00 | (2020.01) | |
| G01S 7/481 | (2006.01) | |

(52) U.S. Cl.
CPC ........... G01S 17/931 (2020.01); B60W 10/18 (2013.01); B60W 10/20 (2013.01); B60W 50/0205 (2013.01); B60W 60/001 (2020.02); G01S 7/4813 (2013.01); G01S 7/4814 (2013.01); G01S 7/4816 (2013.01); G01S 7/4817 (2013.01); B60W 2420/408 (2024.01)

(58) Field of Classification Search
None
See application file for complete search history.

(56) References Cited

U.S. PATENT DOCUMENTS

| | | | | |
|---|---|---|---|---|
| 10,340,651 | B1* | 7/2019 | Drummer | H01S 3/094003 |
| 2016/0266392 | A1* | 9/2016 | Arnold | G02B 3/0087 |
| 2018/0084245 | A1* | 3/2018 | Lapstun | G02B 6/105 |
| 2020/0256960 | A1* | 8/2020 | LaChapelle | G01S 7/4863 |
| 2020/0284883 | A1* | 9/2020 | Ferreira | G01S 7/4815 |

(Continued)

FOREIGN PATENT DOCUMENTS

| | | | | |
|---|---|---|---|---|
| DE | 102018208669 A1 | * | 5/2018 | |
| DE | 102022115267 A1 | * | 12/2023 | G01S 7/493 |

OTHER PUBLICATIONS

Google Machine translation of DE102018208669A1 (May 31, 2018). (Year: 2018).*

*Primary Examiner* — Jean Paul Cass
(74) *Attorney, Agent, or Firm* — DORITY & MANNING P.A.

(57) ABSTRACT

A light detection and ranging (LIDAR) sensor system includes a window, a laser source configured to generate a beam, one or more scanning optics configured to output the beam through the window, and a sensor. The sensor includes at least one light emitter configured to output light associated with a parameter different than a corresponding parameter of the beam, a first optic coupled to the window, the first optic configured to receive the light from the light emitter and provide the light into the window to undergo total internal reflection in the window, a second optic coupled to the window, the second optic configured to receive the light provided into the window by the first optic, and a detector configured to receive the light from the second optic and output a signal indicative of a presence of an obscurant on the window.

20 Claims, 8 Drawing Sheets

(56) References Cited

U.S. PATENT DOCUMENTS

| | | | |
|---|---|---|---|
| 2020/0284908 A1* | 9/2020 | Paulsen | G01S 7/4861 |
| 2020/0300990 A1* | 9/2020 | Eichenholz | G01S 7/4865 |
| 2021/0356600 A1* | 11/2021 | Burbank | G01S 7/4814 |
| 2022/0365189 A1* | 11/2022 | Nathan | G01S 7/497 |
| 2022/0365190 A1* | 11/2022 | Nathan | G01S 7/4817 |
| 2022/0413142 A1* | 12/2022 | Paulsen | G01S 7/486 |
| 2023/0025747 A1* | 1/2023 | Cannon | G01S 7/4865 |
| 2023/0028608 A1* | 1/2023 | Shah | G01S 7/4865 |
| 2023/0038038 A1* | 2/2023 | Mielke | G01S 7/484 |
| 2023/0333255 A1* | 10/2023 | Angus | G01S 17/08 |
| 2023/0358861 A1* | 11/2023 | Sincore | G01S 7/4865 |
| 2024/0030674 A1* | 1/2024 | Sincore | G01S 7/4814 |

\* cited by examiner

LIDAR SYSTEM

BACKGROUND

Optical detection of range using lasers, often referenced by the mnemonic "LIDAR" (for "light detection and ranging"), and also sometimes referred to as "laser RADAR," is used for a variety of applications, including imaging and collision avoidance. LIDAR provides finer scale range resolution with smaller beam sizes than conventional microwave ranging systems, such as radio-wave detection and ranging (RADAR).

SUMMARY

At least one aspect relates to a light detection and ranging (LIDAR) sensor system. The LIDAR sensor system includes a window, a laser source, one or more scanning optics, and a sensor. The laser source is configured to generate a beam. The one or more scanning optics are configured to output the beam through the window. The sensor includes a light emitter, a first optic, a second optic, and a detector. The first light emitter is configured to output light associated with a parameter different than a corresponding parameter of the beam. The first optic is coupled to the window and configured to receive the light from the one or more light emitters and direct the light to a surface of the window at an angle such that the light undergoes total internal reflection in the window. The second optic is coupled to the window and configured to receive the light directed to the window by the first optic. The detector is configured to receive the light from the second optic and output a signal indicative of a presence of an obscurant on the window based on the light received from the second optic.

At least one aspect relates to an autonomous vehicle. The autonomous vehicle includes a LIDAR sensor system, a sensor, a steering system, a braking system, and a vehicle controller. The LIDAR sensor system includes a window, a laser source, one or more scanning optics, and one or more processors. The laser source is configured to generate a beam. The one or more scanning optics are configured to output the beam through the window. The one or more processors are configured to determine at least one of a range to an object or a velocity of the object based on reflection of the beam by the object. The sensor includes a light emitter, a first optic, a second optic, and a detector. The first light emitter is configured to output light associated with a parameter different than a corresponding parameter of the beam. The first optic is coupled to the window and configured to receive the light from the one or more light emitters and direct the light to the window at an angle such that the light undergoes total internal reflection in the window. The second optic is coupled to the window and configured to receive the light provided into the window by the first optic. The detector is configured to receive the light from the second optic and output a signal indicative of a presence of an obscurant on the window based on the light received from the second optic. The vehicle controller is configured to control operation of at least one of the steering system or the braking system based on the at least one of the range or the velocity.

At least one aspect relates to an autonomous vehicle control system. The autonomous vehicle includes a LIDAR sensor system and a sensor. The LIDAR sensor system includes a window, a laser source, one or more scanning optics, and one or more processors. The laser source is configured to generate a beam. The one or more scanning optics are configured to output the beam through the window. The one or more processors are configured to determine at least one of a range to an object or a velocity of the object based on reflection of the beam by the object. The sensor includes a light emitter, a first optic, a second optic, and a detector. The first light emitter is configured to output light associated with a parameter different than a corresponding parameter of the beam. The first optic is coupled to the window and configured to receive the light from the one or more light emitters and direct the light to the window at an angle such that the light undergoes total internal reflection in the window. The second optic is coupled to the window and configured to receive the light provided into the window by the first optic. The detector is configured to receive the light from the second optic and output a signal indicative of a presence of an obscurant on the window based on the light received from the second optic. The one or more processors are configured to control operation of at least one of a steering system of an autonomous vehicle or a braking system of the autonomous vehicle based on the at least one of the range or the velocity.

At least one aspect relates to a sensor. The sensor includes a light emitter configured to output light having at least one parameter different than a corresponding parameter of a beam outputted by a LIDAR sensor system, a first optic coupled to a window of the LIDAR sensor system, the first optic configured to receive the light from the light emitter and direct the light into the window at an angle such that the light undergoes total internal reflection in the window, a second optic coupled to the window, the second optic configured to receive the light directed into the window by the first optic, and a detector configured to receive the light from the second optic and output a signal indicative of a presence of an obscurant on the window based on the light received from the second optic.

Those skilled in the art will appreciate that the summary is illustrative only and is not intended to be in any way limiting. Any of the features described herein may be used with any other features, and any subset of such features can be used in combination according to various embodiments. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Implementations are illustrated by way of example, and not by way of limitation, in the figures of the accompanying drawings in which like reference numerals refer to similar elements and in which.

DETAILED DESCRIPTION

A LIDAR system, such as a LIDAR sensor system, can generate and transmit a light beam that an object can reflect or otherwise scatter as a return beam corresponding to the transmitted beam. The LIDAR sensor system can receive the return beam, and process the return beam or characteristics thereof to determine parameters regarding the object such as range and velocity. The LIDAR sensor system can apply various frequency or phase modulations to the transmitted beam, which can facilitate relating the return beam to the transmitted beam in order to determine the parameters regarding the object.

The LIDAR sensor system can include a window, which may form part of a weatherized enclosure for components of the LIDAR sensor system, such as scanning optics. For example, the transmitted beam can be outputted through the window, and the return beam can be received through the window. Obscurants, such as water or dirt, can be present on the window, which can affect at least one of the transmitted beam or the return beam and thus signal processing performed using at least one of the transmitted beam or the return beam.

Systems and methods in accordance with the present disclosure can implement a sensor to detect a presence of an obscurant on the window. The sensor can output an indication of the detection to other systems, for example a remote device or a cleaning system. For example, the sensor can include a first optical element to couple light into the window. The light can undergo total internal reflection within the window of the LIDAR sensor system and continue to be reflected within the window until it travels to the other end of the window, where it is coupled out of the window to a second optical element of the sensor. The obscurant can modify how the light travels through the window, such as to reduce an amount of light that is coupled out of the window to the second optical element. The sensor can detect the light received by the second optical element and perform signal processing on the detected light to detect the presence of the obscurant.

There can be interference with the light passed through the window by the sensor, such as from ambient light or the signals transmitted or received by the LIDAR sensor system. This can make it challenging to reliably detect light corresponding to the presence of obscurants on the window of the LIDAR sensor system. Systems and methods in accordance with the present disclosure can control one or more parameters of the light used by the sensor to reduce or minimize interference. For example, parameters such as wavelengths, timing or pulsing, amplitude, phase, or various combinations thereof of the light used by the sensor can be controlled to more reliably detect obscurants.

1. System Environments for Autonomous Vehicles

Figure 1:
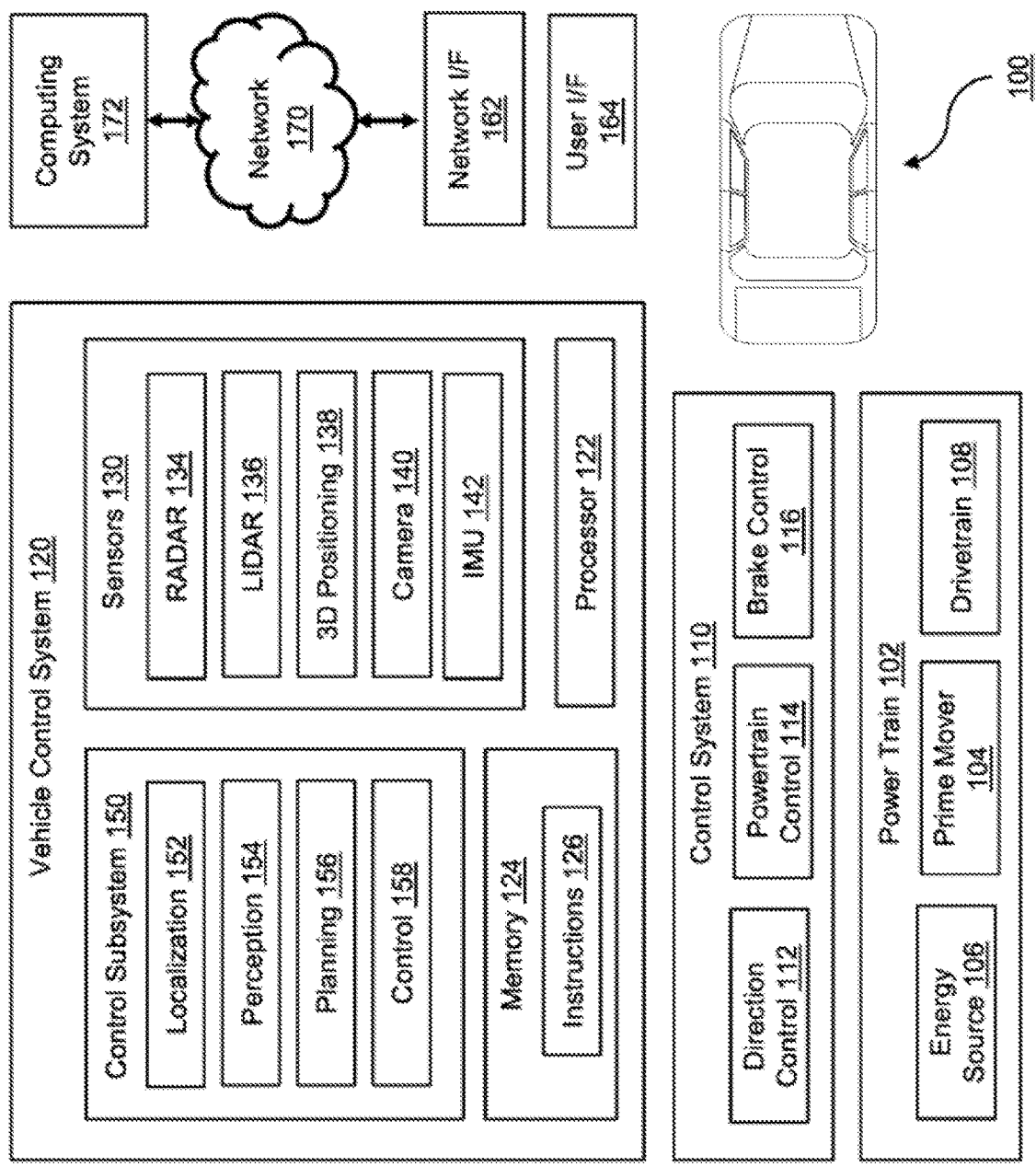
FIG. 1 is a block diagram of an example of a system environment for autonomous vehicles.

FIG. 1 is a block diagram illustrating an example of a system environment for autonomous vehicles according to some implementations. FIG. 1 depicts an example autonomous vehicle 100 within which the various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may be implemented as any number of different types of vehicles, including vehicles capable of transporting people and/or cargo, and capable of traveling in various environments. The aforementioned components 102-116 can vary widely based upon the type of vehicle within which these components are utilized, such as a wheeled land vehicle such as a car, van, truck, or bus. The prime mover 104 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 108 can include wheels and/or tires along with a transmission and/or any other mechanical drive components to convert the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, may utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers.

Various levels of autonomous control over the vehicle 100 can be implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)") and/or central processing unit(s) ("CPU(s)").

Sensors 130 may include various sensors suitable for collecting information from a vehicle's surrounding environment for use in controlling the operation of the vehicle. For example, sensors 130 can include radar sensor 134, LIDAR (Light Detection and Ranging) sensor 136, a 3D positioning sensors 138, e.g., any of an accelerometer, a gyroscope, a magnetometer, or a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 100. Each sensor 130 can output sensor data at various data rates, which may be different than the data rates of other sensors 130.

The outputs of sensors 130 may be provided to a set of control subsystems 150, including a localization subsystem 152, a planning subsystem 156, a perception subsystem 154, and a control subsystem 158. The localization subsystem 152 can perform functions such as precisely determining the location and orientation (also sometimes referred to as "pose") of the vehicle 100 within its surrounding environment, and generally within some frame of reference. The location of an autonomous vehicle can be compared with the location of an additional vehicle in the same environment as part of generating labeled autonomous vehicle data. The perception subsystem 154 can perform functions such as detecting, tracking, determining, and/or identifying objects within the environment surrounding vehicle 100. A machine learning model in accordance with some implementations can be utilized in tracking objects. The planning subsystem 156 can perform functions such as planning a trajectory for vehicle 100 over some timeframe given a desired destination as well as the static and moving objects within the environment. A machine learning model in accordance with some implementations can be utilized in planning a vehicle trajectory. The control subsystem 158 can perform functions such as generating suitable control signals for controlling the various controls in the vehicle control system 120 in order to implement the planned trajectory of the vehicle 100. A machine learning model can be utilized to generate one or more signals to control an autonomous vehicle to implement the planned trajectory.

Multiple sensors of types illustrated in FIG. 1 can be used for redundancy and/or to cover different regions around a vehicle, and other types of sensors may be used. Various types and/or combinations of control subsystems may be used. Some or all of the functionality of a subsystem 152-158 may be implemented with program code instructions 126 resident in one or more memories 124 and executed by one or more processors 122, and these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

Various architectures, including various combinations of software, hardware, circuit logic, sensors, and networks, may be used to implement the various components illustrated in FIG. 1. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors illustrated in FIG. 1, or entirely separate processors, may be used to implement additional functionality in the vehicle 100 outside of the purposes of autonomous control, e.g., to control entertainment systems, to operate doors, lights, convenience features, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 100 may include a user interface 164 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 100 may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 100 receives environmental and other data for use in autonomous control thereof. Data collected by the one or more sensors 130 can be uploaded to a computing system 172 via the network 170 for additional processing. In some implementations, a time stamp can be added to each instance of vehicle data prior to uploading.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code can include one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. Any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), the present disclosure is not limited to the specific organization and allocation of program functionality described herein.

2. LIDAR for Automotive Applications

Figure 5:
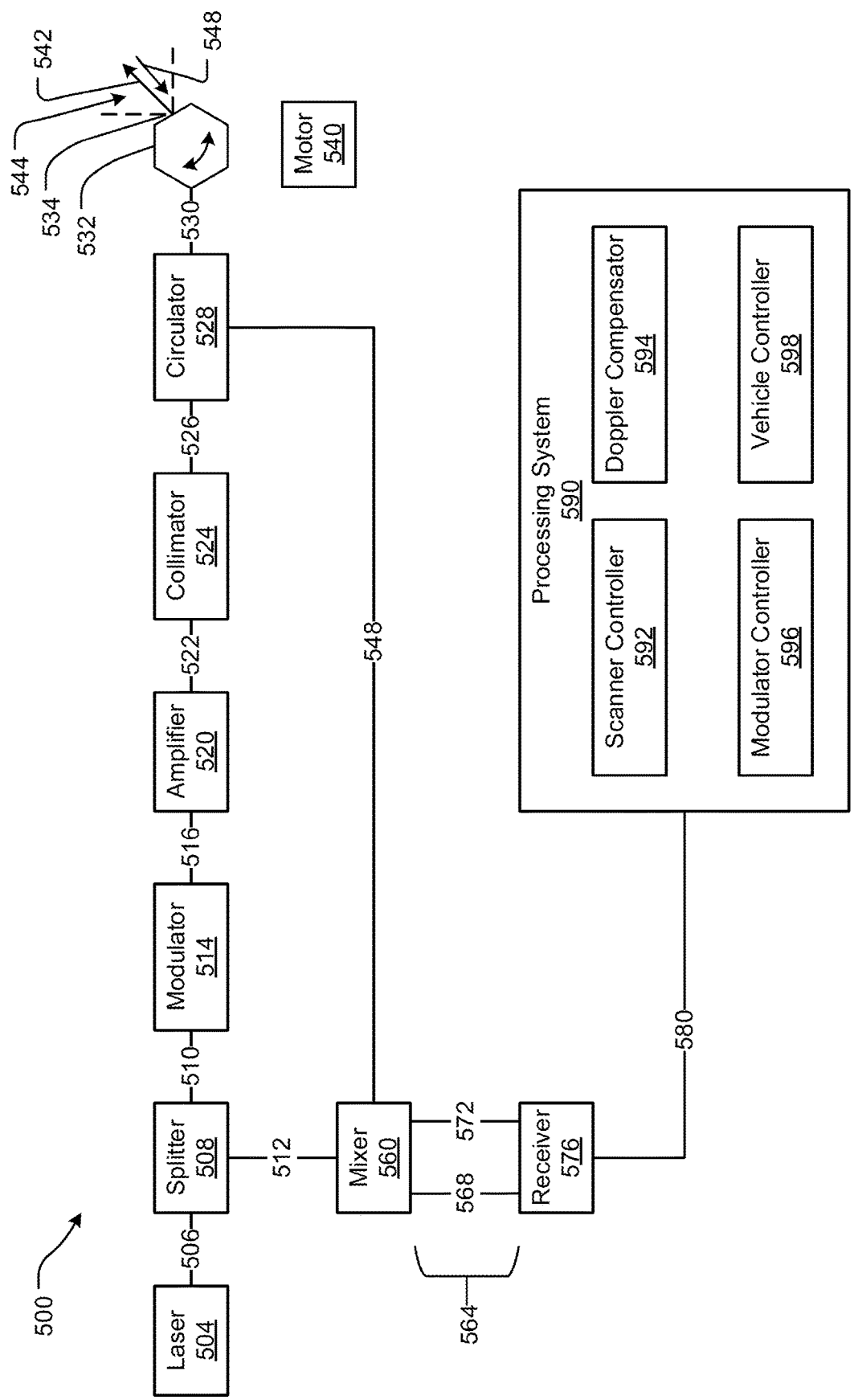
FIG. 5 is a block diagram of an example of a LIDAR sensor system.

A truck can include a LIDAR system (e.g., vehicle control system 120 in FIG. 1, LIDAR system 500 in FIG. 5, among others described herein). In some implementations, the LIDAR system can use frequency modulation to encode an optical signal and scatter the encoded optical signal into free-space using optics. By detecting the frequency differences between the encoded optical signal and a returned signal reflected back from an object, the frequency modulated (FM) LIDAR system can determine the location of the object and/or precisely measure the velocity of the object using the Doppler effect. In some implementations, an FM LIDAR system may use a continuous wave (referred to as, "FMCW LIDAR") or a quasi-continuous wave (referred to as, "FMQW LIDAR"). In some implementations, the LIDAR system can use phase modulation (PM) to encode an optical signal and scatters the encoded optical signal into free-space using optics.

In some instances, an object (e.g., a pedestrian wearing dark clothing) may have a low reflectivity, in that it only reflects back to the sensors (e.g., sensors 130 in FIG. 1) of the FM or PM LIDAR system a low amount (e.g., 10% or less) of the light that hit the object. In other instances, an object (e.g., a shiny road sign) may have a high reflectivity (e.g., above 10%), in that it reflects back to the sensors of the FM LIDAR system a high amount of the light that hit the object.

Regardless of the object's reflectivity, an FM LIDAR system may be able to detect (e.g., classify, recognize, discover, etc.) the object at greater distances (e.g., 2×) than a conventional LIDAR system. For example, an FM LIDAR system may detect a low reflectively object beyond 300 meters, and a high reflectivity object beyond 400 meters.

To achieve such improvements in detection capability, the FM LIDAR system may use sensors (e.g., sensors 130 in FIG. 1). In some implementations, these sensors can be single photon sensitive, meaning that they can detect the smallest amount of light possible. While an FM LIDAR system may, in some applications, use infrared wavelengths (e.g., 950 nm, 1550 nm, etc.), it is not limited to the infrared wavelength range (e.g., near infrared: 800 nm-1500 nm; middle infrared: 1500 nm-5600 nm; and far infrared: 5600 nm-1,000,000 nm). By operating the FM or PM LIDAR system in infrared wavelengths, the FM or PM LIDAR system can broadcast stronger light pulses or light beams than conventional LIDAR systems.

Thus, by detecting an object at greater distances, an FM LIDAR system may have more time to react to unexpected obstacles. Indeed, even a few milliseconds of extra time could improve response time and comfort, especially with heavy vehicles (e.g., commercial trucking vehicles) that are driving at highway speeds.

The FM LIDAR system can provide accurate velocity for each data point instantaneously. In some implementations, a velocity measurement is accomplished using the Doppler effect which shifts frequency of the light received from the object based at least one of the velocity in the radial direction (e.g., the direction vector between the object detected and the sensor) or the frequency of the laser signal. For example, for velocities encountered in on-road situations where the velocity is less than 100 meters per second (m/s), this shift at a wavelength of 1550 nanometers (nm) amounts to the frequency shift that is less than 130 megahertz (MHz). This frequency shift is small such that it is difficult to detect directly in the optical domain. However, by using coherent detection in FMCW, PMCW, or FMQW LIDAR systems, the signal can be converted to the RF domain such that the frequency shift can be calculated using various signal processing techniques. This enables the autonomous vehicle control system to process incoming data faster.

Instantaneous velocity calculation also makes it easier for the FM LIDAR system to determine distant or sparse data points as objects and/or track how those objects are moving over time. For example, an FM LIDAR sensor (e.g., sensors 130 in FIG. 1) may only receive a few returns (e.g., hits) on an object that is 300 m away, but if those return give a velocity value of interest (e.g., moving towards the vehicle at >70 mph), then the FM LIDAR system and/or the autonomous vehicle control system may determine respective weights to probabilities associated with the objects.

Faster identification and/or tracking of the FM LIDAR system gives an autonomous vehicle control system more time to maneuver a vehicle. A better understanding of how fast objects are moving also allows the autonomous vehicle control system to plan a better reaction.

The FM LIDAR system can have less static compared to conventional LIDAR systems. That is, the conventional LIDAR systems that are designed to be more light-sensitive typically perform poorly in bright sunlight. These systems also tend to suffer from crosstalk (e.g., when sensors get confused by each other's light pulses or light beams) and from self-interference (e.g., when a sensor gets confused by its own previous light pulse or light beam). To overcome these disadvantages, vehicles using the conventional LIDAR systems often need extra hardware, complex software, and/or more computational power to manage this "noise."

In contrast, FM LIDAR systems do not suffer from these types of issues because each sensor is specially designed to respond only to its own light characteristics (e.g., light beams, light waves, light pulses). If the returning light does not match the timing, frequency, and/or wavelength of what was originally transmitted, then the FM sensor can filter (e.g., remove, ignore, etc.) out that data point. As such, FM LIDAR systems produce (e.g., generates, derives, etc.) more accurate data with less hardware or software requirements, enabling smoother driving.

The FM LIDAR system can be easier to scale than conventional LIDAR systems. As more self-driving vehicles (e.g., cars, commercial trucks, etc.) show up on the road, those powered by an FM LIDAR system likely will not have to contend with interference issues from sensor crosstalk. Furthermore, an FM LIDAR system uses less optical peak power than conventional LIDAR sensors. As such, some or all of the optical components for an FM LIDAR can be produced on a single chip, which produces its own benefits, as discussed herein.

2.1 Commercial Trucking

Figure 2:
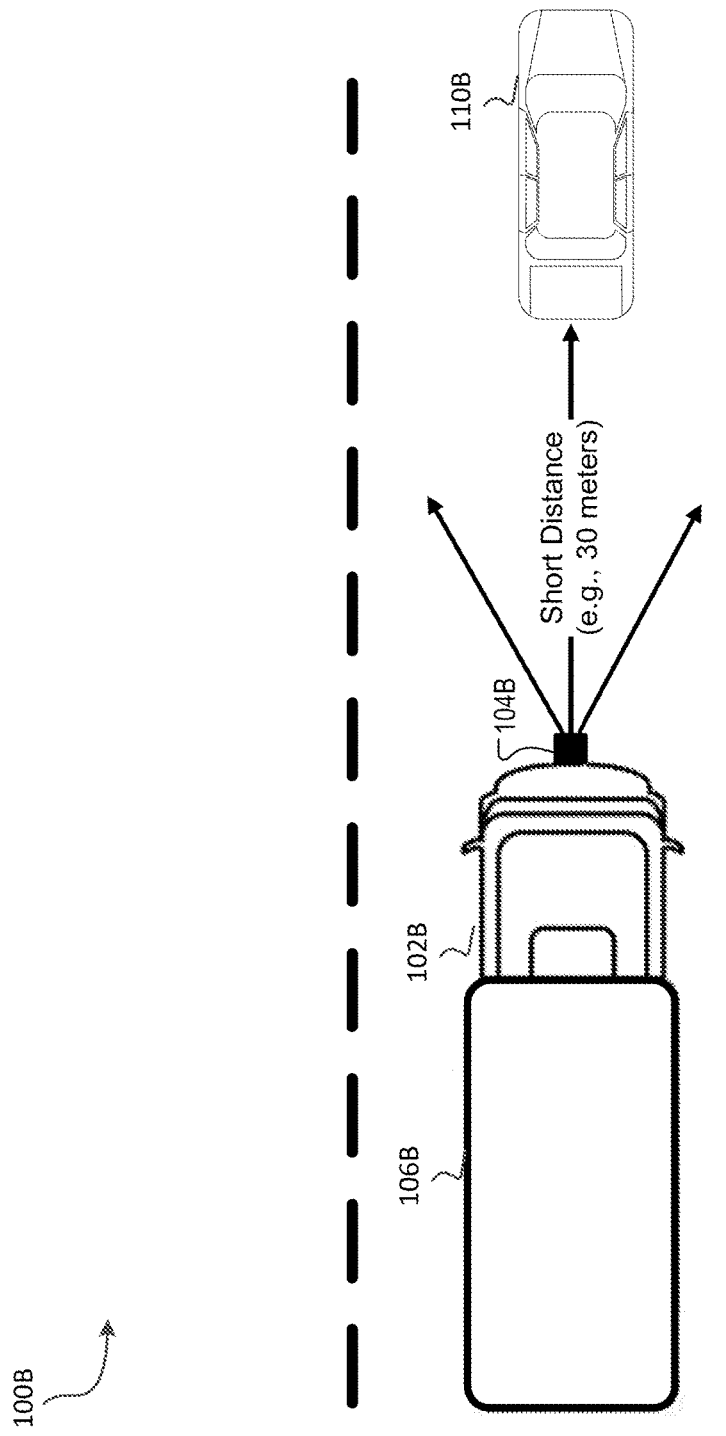
FIG. 2 is a block diagram of an example of a system environment for autonomous commercial trucking vehicles.

FIG. 2 is a block diagram illustrating an example of a system environment for autonomous commercial trucking vehicles, according to some implementations. The environment 100B includes a commercial truck 102B for hauling cargo 106B. In some implementations, the commercial truck 102B may include vehicles configured to long-haul freight transport, regional freight transport, intermodal freight transport (i.e., in which a road-based vehicle is used as one of multiple modes of transportation to move freight), and/or any other road-based freight transport applications. In some implementations, the commercial truck 102B may be a flatbed truck, a refrigerated truck (e.g., a reefer truck), a vented van (e.g., dry van), a moving truck, etc. In some implementations, the cargo 106B may be goods and/or produce. In some implementations, the commercial truck 102B may include a trailer to carry the cargo 106B, such as a flatbed trailer, a lowboy trailer, a step deck trailer, an extendable flatbed trailer, a sidekit trailer, etc.

The environment 100B includes an object 110B (shown in FIG. 2 as another vehicle) that is within a distance range that is equal to or less than 30 meters from the truck.

The commercial truck 102B may include a LIDAR system 104B (e.g., an FM LIDAR system, vehicle control system 120 in FIG. 1, LIDAR system 500 in FIG. 5) for determining a distance to the object 110B and/or measuring the velocity of the object 110B. Although FIG. 2 shows that one LIDAR system 104B is mounted on the front of the commercial truck 102B, the number of LIDAR system and the mounting area of the LIDAR system on the commercial truck are not limited to a particular number or a particular area. The commercial truck 102B may include any number of LIDAR systems 104B (or components thereof, such as sensors, modulators, coherent signal generators, etc.) that are mounted onto any area (e.g., front, back, side, top, bottom, underneath, and/or bottom) of the commercial truck 102B to facilitate the detection of an object in any free-space relative to the commercial truck 102B.

As shown, the LIDAR system 104B in environment 100B may be configured to detect an object (e.g., another vehicle, a bicycle, a tree, street signs, potholes, etc.) at short distances (e.g., 30 meters or less) from the commercial truck 102B.

Figure 3:
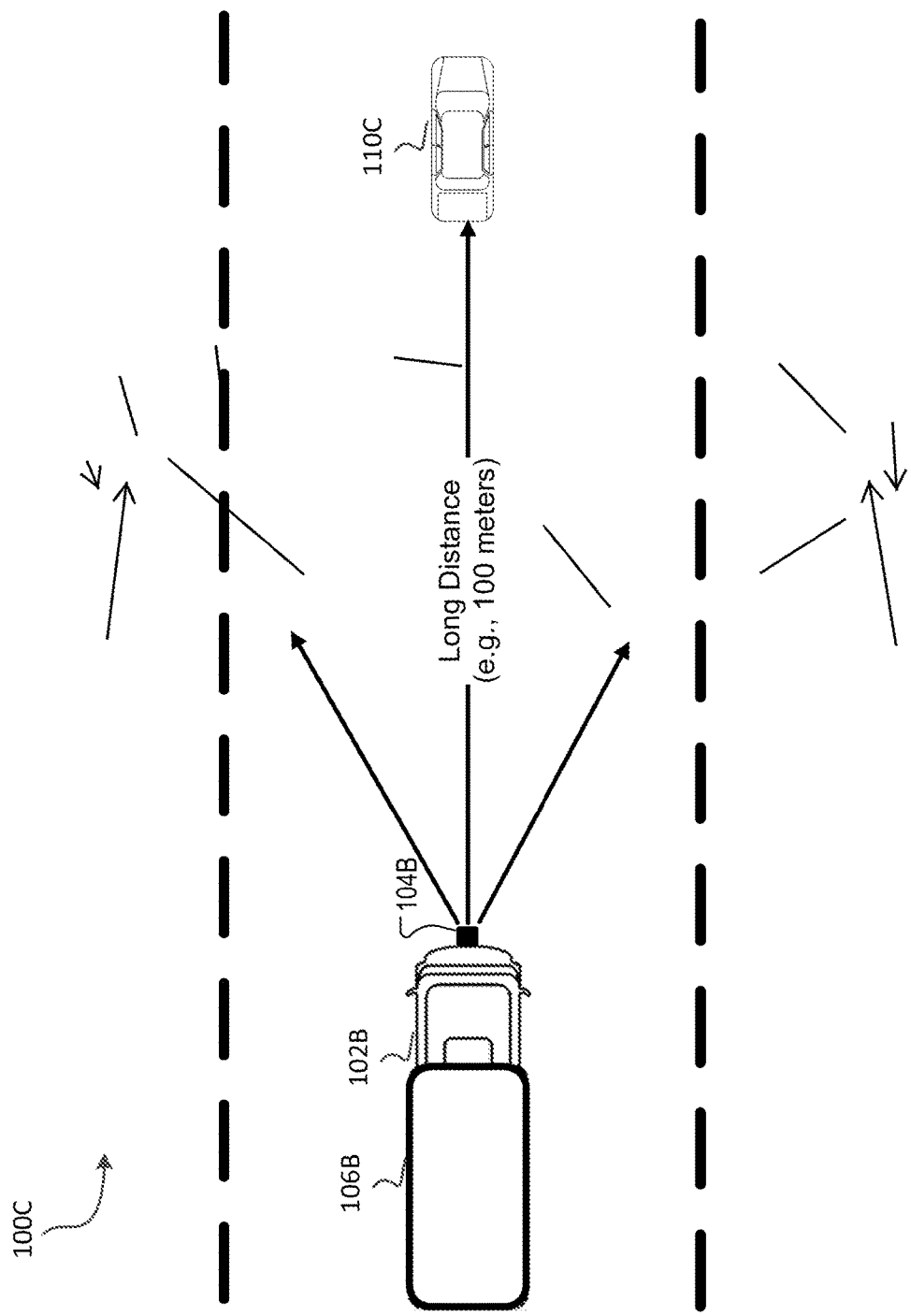
FIG. 3 is a block diagram of an example of a system environment for autonomous commercial trucking vehicles.

FIG. 3 is a block diagram illustrating an example of a system environment for autonomous commercial trucking vehicles, according to some implementations. The environment 100C includes the same components (e.g., commercial truck 102B, cargo 106B, LIDAR system 104B, etc.) that are included in environment 100B.

The environment 100C includes an object 110C (shown in FIG. 3 as another vehicle) that is within a distance range that is (i) more than 30 meters and (ii) equal to or less than 150 meters from the commercial truck 102B. As shown, the LIDAR system 104B in environment 100C may be configured to detect an object (e.g., another vehicle, a bicycle, a tree, street signs, potholes, etc.) at a distance (e.g., 100 meters) from the commercial truck 102B.

Figure 4:
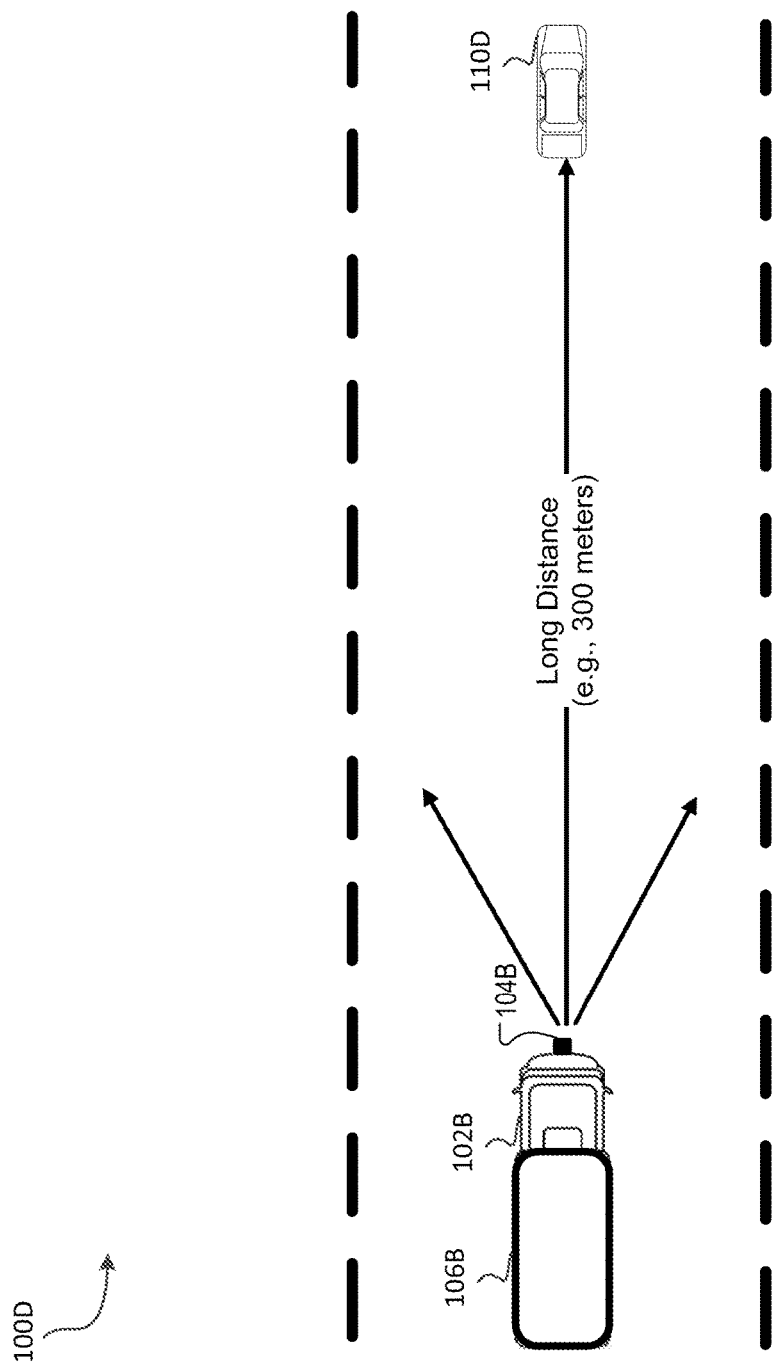
FIG. 4 is a block diagram of an example of a system environment for autonomous commercial trucking vehicles.

FIG. 4 is a block diagram illustrating an example of a system environment for autonomous commercial trucking vehicles, according to some implementations. The environment 100D includes the same components (e.g., commercial truck 102B, cargo 106B, LIDAR system 104B, etc.) that are included in environment 100B.

The environment 100D includes an object 110D (shown in FIG. 4 as another vehicle) that is within a distance range that is more than 150 meters from the commercial truck 102B. As shown, the LIDAR system 104B in environment 100D may be configured to detect an object (e.g., another vehicle, a bicycle, a tree, street signs, potholes, etc.) at a distance (e.g., 300 meters) from the commercial truck 102B.

In commercial trucking applications, it is important to effectively detect objects at all ranges due to the increased weight and, accordingly, longer stopping distance required for such vehicles. FM LIDAR systems (e.g., FMCW and/or FMQW systems) or PM LIDAR systems are well-suited for commercial trucking applications due to the advantages described above. As a result, commercial trucks equipped with such systems may have an enhanced ability to move both people and goods across short or long distances. In various implementations, such FM or PM LIDAR systems can be used in semi-autonomous applications, in which the commercial truck has a driver and some functions of the commercial truck are autonomously operated using the FM or PM LIDAR system, or fully autonomous applications, in which the commercial truck is operated entirely by the FM or LIDAR system, alone or in combination with other vehicle systems.

3. LIDAR Systems

FIG. 5 depicts an example of a LIDAR system 500 (e.g., LIDAR sensor system). The LIDAR system 500 can be used to determine parameters regarding objects, such as range and velocity, and output the parameters to a remote system. For example, the LIDAR system 500 can output the parameters for use by a vehicle controller that can control operation of a vehicle responsive to the received parameters (e.g., vehicle controller 598) or a display that can present a representation of the parameters. The LIDAR system 500 can be a coherent detection system. The LIDAR system 500 can be used to implement various features and components of the systems described with reference to FIGS. 1-4. The LIDAR system 500 can include components for performing various detection approaches, such as to be operated as an amplitude modular LIDAR system or a coherent LIDAR system. The LIDAR system 500 can be used to perform time of flight range determination.

The LIDAR system 500 can include a laser source 504 that emits a beam 506, such as a carrier wave light beam. A splitter 508 can split the beam 506 into a beam 510 and a reference beam 512 (e.g., reference signal).

A modulator 514 can modulate one or more properties of the input beam 510 to generate a beam 516 (e.g., target beam). In some implementations, the modulator 514 can modulate a frequency of the input beam 510 (e.g., optical frequency corresponding to optical wavelength, where c=λv, where c is the speed of light, λ is the wavelength, and v is the frequency). For example, the modulator 514 can modulate a frequency of the input beam 510 linearly such that a frequency of the beam 516 increases or decreases linearly over time. As another example, the modulator 514 can modulate a frequency of the input beam 510 non-linearly (e.g., exponentially, sinusoidally). In some implementations, the modulator 514 can modulate a phase of the input beam 510 to generate the beam 516. However, the modulation techniques are not limited to the frequency modulation and the phase modulation. Any suitable modulation techniques can be used to modulate one or more properties of a beam. Returning to FIG. 5, the modulator 514 can modulate the beam 510 subsequent to splitting of the beam 506 by the splitter 508, such that the reference beam 512 is unmodulated, or the modulator 514 can modulate the beam 506 and provide a modulated beam to the splitter 508 for the splitter 508 to split into a target beam and a reference beam.

The beam 516, which is used for outputting a transmitted signal, can have most of the energy of the beam 506 outputted by the laser source 504, while the reference beam 512 can have significantly less energy, yet sufficient energy to enable mixing with a return beam 548 (e.g., returned light) scattered from an object. The reference beam 512 can be used as a local oscillator (LO) signal. The reference beam 512 passes through a reference path and can be provided to a mixer 560. An amplifier 520 can amplify the beam 516 to output a beam 522, which a collimator 524 can collimate to output a beam 526.

As depicted in FIG. 5, a circulator 528 can be between the collimator 524 and optics 532 to receive the beam 526 and output a beam 530 to the optics 532. The circulator 528 can be between the laser source 504 and the collimator 524. The circulator 528 can receive return beam 548 from the optics 532 and provide the return beam 548 to the mixer 560. The optics 532 can be scanning optics, such as one or more polygon reflectors or deflectors to adjust the angle of received beams relative to outputted beams based on the orientation of outer surfaces (e.g., facets) of the optics relative to the received beam, or solid-state components (e.g., phased arrays, electro-optic crystals) configured to modify the direction of received light.

The optics 532 can define a field of view 544 that corresponds to angles scanned (e.g., swept) by the beam 542 (e.g., a transmitted beam). For example, the beam 542 can be scanned in the particular plane, such as an azimuth plane or elevation plane (e.g., relative to an object to which the LIDAR system 500 is coupled, such as an autonomous vehicle). The optics 532 can be oriented so that the field of view 544 sweeps an azimuthal plane relative to the optics 532.

At least one motor 540 can be coupled with the optics 532 to control at least one of a position or an orientation of the optics 532 relative to the beam 530. For example, where the optics 532 include a reflector or deflector, the motor 540 can rotate the optics 532 so that surfaces of the optics 532 at which the beam 530 is received vary in angle or orientation relative to the beam 530, causing the beam 542 to be varied in angle or direction as the beam 542 is outputted from the optics 532.

The beam 542 can be outputted from the optics 532 and reflected or otherwise scattered by an object (not shown) as a return beam 548 (e.g., return signal). The return beam 548 can be received on a reception path, which can include the circulator 528, and provided to the mixer 560.

The mixer 560 can be an optical hybrid, such as a 90 degree optical hybrid. The mixer 560 can receive the reference beam 512 and the return beam 548, and mix the reference beam 512 and the return beam 548 to output a signal 564 responsive to the reference beam 512 and the return beam 548. The signal 564 can include an in-phase (I) component 568 and a quadrature (Q) component 572.

The LIDAR system 500 can include a receiver 576 that receives the signal 564 from the mixer 560. The receiver 576 can generate a signal 580 responsive to the signal 564, which can be an electronic (e.g., radio frequency) signal. The receiver 576 can include one or more photodetectors that output the signal 580 responsive to the signal 564.

The LIDAR system 500 can include a processing system 590, which can be implemented using features of the vehicle control system 120 described with reference to FIG. 1. The processing system 590 can process data received regarding the return beam 548, such as the signal 580, to determine parameters regarding the object such as range and velocity. The processing system 590 can include a scanner controller 592 that can provide scanning signals to control operation of the optics 532, such as to control the motor 540 to cause the motor 540 to rotate the optics 532 to achieve a target scan pattern, such as a sawtooth scan pattern or step function scan pattern. The processing system 590 can include a Doppler compensator 594 that can determine the sign and size of a Doppler shift associated with processing the return beam 548 and a corrected range based thereon along with any other corrections. The processing system 590 can include a modulator controller 596 that can send one or more electrical signals to drive the modulator 514.

The processing system 590 can include or be communicatively coupled with a vehicle controller 598 to control operation of a vehicle for which the LIDAR system 500 is installed (e.g., to provide complete or semi-autonomous control of the vehicle). For example, the vehicle controller 598 can be implemented by at least one of the LIDAR system 500 or control circuitry of the vehicle. The vehicle controller 598 can control operation of the vehicle responsive to at least one of a range to the object or a velocity of the object determined by the processing system 590. For example, the vehicle controller 598 can transmit a control signal to at least one of a steering system or a braking system of the vehicle to control at least one of speed or direction of the vehicle.

4. Total Internal Reflection (TIR) Sensor for LIDAR Monitoring

As discussed above, a LIDAR system (e.g., LIDAR systems, such as LIDAR sensor systems, including but not limited to LIDAR system 500) can transmit and receive optical signals (e.g., beams of light) through a window. The window is transmissive at least at a wavelength (e.g., operating wavelength) or over a wavelength range of the optical signals that the LIDAR system transmits. The window can form or be part of a weatherized enclosure in which the LIDAR system is provided. Various obscurants such as water or dirt, among others, may collect on the window, which can affect the optical signals transmitted and received by the LIDAR system.

A sensor can be attached to an inside surface of the window. The sensor can determine whether an obscurant is present on the window and provide an indication of the presence of the obscurant to a remote device or other systems, such as a cleaning system. For example, the sensor can output light at a predetermined angle such that it is coupled into the window to undergo total internal reflection. The light coupled into the window can travel to an opposing end of the window where it is coupled out of the window and received by a detector of the sensor. As the light travels to the other end of the window, some light may escape or otherwise be affected by an obscurant, and the detector can detect the resulting change in the light (e.g., change in power of the light) in order to detect the presence of the obscurant. The sensor can output an indication of the presence of the obscurant, such as to indicate that a detection condition associated with the presence of the obscurant is satisfied (or not satisfied). For example, the sensor can determine that a power of light received through the window is less than an expected power, indicating that the obscurant may be present on the window (or determine that the power is greater than or equal to the expected power, indicating that the obscurant may not be present on the window).

The sensor can output a plurality of light beams in a manner to achieve total light coverage of the window, such as to span a cross-section of the window from the surface of the window to which the sensor is coupled to an opposing surface of the window. This can improve the ability of the sensor to detect obscurants at various locations of the window, such as to achieve total coverage of the window for obscurant detection. The sensor can pass light through the window in a manner that avoids or minimizes interference with other light in and around the window, which can improve the reliability of the obscurant detection.

Figure 6:
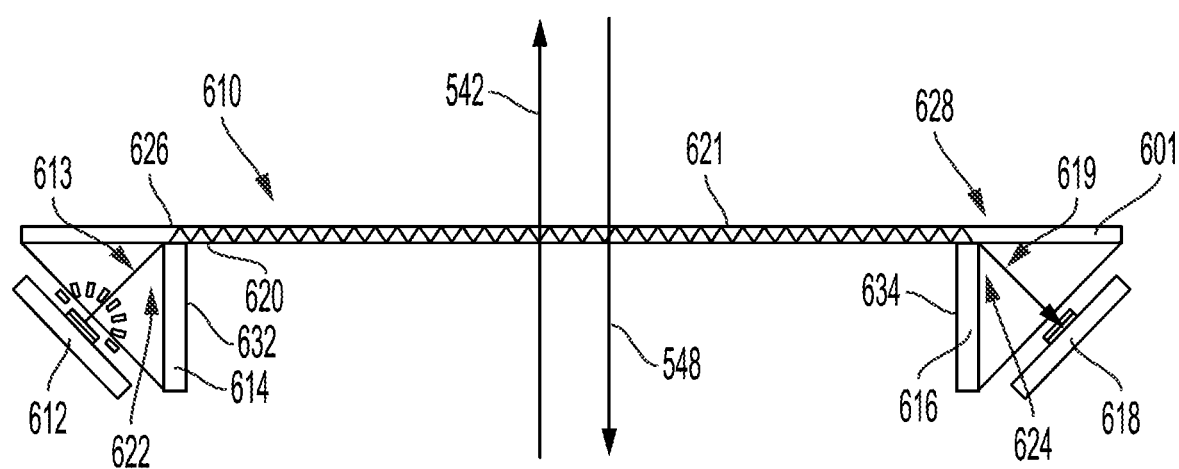
FIG. 6 is a schematic diagram of an example of a sensor for LIDAR monitoring.

FIG. 6 depicts an example of a sensor 610, which can be used to detect a presence of one or more obscurants on a window 601 of a LIDAR system, such as the LIDAR system 500. For example, as depicted in FIG. 6, the LIDAR system 500 can output a beam 542 through the window 601 (e.g., using laser source 504 and scanning optics 532) and receive a beam 548 through the window 601. The sensor 610 can perform the detection of obscurants in various timing schemes, such as to detect continuously, intermittently, or in response to particular trigger conditions (e.g., based on a schedule or a maintenance check request; in response to activation or operation of the LIDAR system 500). The obscurant can be, for example, material on the window 601 such as rain, biomass, soil, oil, or moisture (e.g., from fog or condensation), or a defect in the window 601 (e.g., a chip). The sensor 610 can detect more than one obscurant on the window 601 based on the extent of coverage of the volume of the window 601 by light 613 outputted by light emitters 612.

The window 601 can form or be part of a weatherized enclosure in which the LIDAR system 500 is provided. For example, the enclosure can seal the window 601 and a space defined by the window 601 to limit moisture, dirt, or other materials from entering the enclosure. The window 601 can have a first end 626 and a second end 628. As described in further detail below with respect to optics 614, 616, light can be coupled into or out of the window 601 at various points along the window 601, including at the first end 626 and the second end 628. The window 601 can be of various sizes, such as from about 1 millimeter to about 300 millimeters in at least one of a length dimension (e.g., from the first end 626 to the second end 628) or a width dimension (e.g., transverse to the length dimension, such as into the page in the frame of reference depicted in FIG. 6).

The window 601 can be transmissive. The window 601 can be transmissive at least at a wavelength (e.g., operating wavelength) or over a wavelength range of the optical signals that the LIDAR system 500 transmits. The window 601 can be a transmissive material such as glass. For example, the window 601 can be borosilicate glass. The window 601 can be made from a material having an index of refraction such that over a target temperature range of operation of the LIDAR system 500 (e.g., from about −20 degrees Celsius to about 67 degrees Celsius), light 613 coupled into the window 601 undergoes total internal reflection where surface 621 is in contact with air, and is refracted out of the window 601 through surface 621 by an obscurant (e.g., water, dirt).

The window 601 can have a particular angle, such that light coupled into the window 601 (e.g., by first optic 614), at an angle greater than the particular angle, undergoes total internal reflection in the window 601. For example, the particular angle can be a critical angle of the window 601 above which light incident on the window 601 can enter the window 601 to undergo total internal reflection, and below which light incident on the window 601 is at least partially reflected by the window 601. The particular angle can correspond to the material of the window 601 and the medium (i.e., air, or any obscurants on the window 601) outside of the window 601 (e.g., on an opposite side of the window 601 from first optic 614), such as to correspond to an index of refraction of the window 601 and an index of refraction of air. The window 601 can have a critical angle greater than or equal to about 30 degrees and less than or equal to about 60 degrees. The window 601 can have a critical angle greater than or equal to about 35 degrees and less than or equal to about 49 degrees. For example, the window 601 can have a critical angle of about 42 degrees.

The sensor 610 can be a total internal reflection ("TIR") sensor 610, such as by being configured to output light at an angle, such as a predetermined angle, that is greater than the particular angle of the window 601. For example, since the angle of the light output by the sensor 610 is greater than the particular angle of the window 601, the light can undergo total internal reflection responsive to being coupled into the window 601 (e.g., at the first end 626). The light can continue to be reflected within the window 601 (rather than being refracted out of the window 601) until it reaches the second end 628 of the window 601, where it can be coupled out of the window 601 by second optic 616.

The sensor 610 can be coupled with the window 601, such as by being attached or bonded to a surface 620 of the window 601 by an adhesive (e.g., liquid, gel, epoxy). For example, the sensor 610 can be coupled with the window 601 using an epoxy having an index of refraction that is equal to or about equal to an index of refraction of the window 601. The sensor 610 (including components thereof, such as the first optic 614 and the second optic 616) can be coupled by the epoxy with the window 601 on the surface 620. The window surface 620 is the same side of the window 601 that the scanning optics 532 can be coupled with. The window surface 620 can be on the side of the window 601 that is within the weatherized enclosure that the window 601 can form or can be a part of.

The sensor 610 can include at least one light emitter 612. For example, the sensor 610 can include a plurality of light emitters 612, forming at least one array of light emitters 612. The light emitters 612 can be light emitting diodes (LEDs). The light emitters 612 can output light 613 (e.g., beams of light, such as one or more sensor beams, which may be the same as or similar to the beams generated by laser source 504 or other components of the LIDAR system 500) at one or more wavelengths. The one or more wavelengths can be different than the wavelength of at least one of the beam 542 or the beam 548, which can facilitate preventing interference between operation of the sensor 610 and the LIDAR system 500.

The sensor 610 can include at least one first optic 614. The first optic 614 can be between the light emitters 612 and the surface 620 of the window 601. For example, the first optic 614 can be coupled to the first end 626 of the window 601 by epoxy (e.g., index-matching epoxy). The first optic 614 can be a light coupling element, such as a prism.

The first optic 614 can receive light 613 from the light emitters 612 and direct the received light 613 to the window 601, such as to couple the received light 613 into the window 601. For example, the first optic 614 can output the received light 613 at a first angle of incidence 622 (defined between a line orthogonal to the window surface 620 and a direction of the light 613). The first angle of incidence 622 can be between at least one of a minimum angle or a maximum angle such that responsive to being coupled into the window 601 through the window surface 620, the light 613 can undergo total internal reflection in the window 601. For example, where the indices of refraction of the first optic 614 and the window 601 are about equal (along with the index of refraction of the epoxy between the first optic 614 and the window surface 620), the light emitters 612 and first optic 614 can be arranged such that the first angle of incidence 622 allows the light 613 to be coupled into the window 601 along a direction about equal to the direction by which the light 613 passes through the first optic 614, so that the angle of the light 613 as it passes through the window 601 responsive to being coupled into the window 601 is greater than the particular angle of the window 601 to enable the light 613 to undergo total internal reflection in the window 601.

The sensor 610 can have a plurality of light emitters 612, which can be arranged to correspond to a size of the window 601. For example, the sensor 610 can have at least a threshold number light emitters 612 to span the window 601 (e.g., so that beams of light 613 extend fully across a cross-sectional area of the window 601), which can ensure uniform coverage of the window 601. For example, at least one of a spacing between the light emitters 612, a number of light emitters 612, and a beam size of the light emitters 612 can be configured so that there are no gaps between the beams of light 613 as the light 613 passes from the window surface 620 to the opposing window surface 621. The sensor 610 can have a number of light emitters 612 that depends on a minimum size of the feature (obscurant) being detected. Since light 613 can escape the window 601 in the presence of an obscurant on the window 601, the minimum size of the feature being detected can influence the configuration (e.g., at least one of number of light emitters 612, spacing of light emitters 612, or beam sizes of light emitters 612) of the light emitters 612. The light emitters 612 can be arranged based on a minimize feature size corresponding to a size of the obscurant, such as a size of a raindrop (e.g., to provide gaps no greater than about 1 square millimeter to about 5 square millimeters).

The number, spacing, and/or beam sizes of light emitters 612 can be sufficient to span the window 601 area, such as to have the light 613 undergoing total internal reflection in the window 601 be reflected off of at least a threshold surface area of opposing surface 621 so that a target surface area of obscurants is greater than any gap associated with the threshold surface area. This can ensure uniform coverage of the window 601, as any obscurant having a surface area greater than or equal to the target surface area will coincide with the threshold surface area and in turn can cause light 613 to be coupled out of the window 601 (e.g., instead of continuing to undergo total internal reflection until reaching second optic 614). For example, the light 613 output by the one or more light emitters 612 can be incident at every point in the window 601 after it is coupled with the window 601 (unless refracted out of the window 601 by an obscurant or second optic 614). Since there is light 613 at every point in the window 601, the sensor 610 can detect if an obscurant 702 is present anywhere on the window 601.

The one or more light emitters 612 of the sensor 610 can output light 613 simultaneously. For example, a plurality of light-emitting diode arrays can output light 613 simultaneously. For example, each of the light-emitting diode arrays can output light 613 at the same time as each other. The one or more light emitters 612 of the sensor 610 can output light 613 non-simultaneously. For example, a plurality of light-emitting diode arrays can output light 613 non-simultaneously. For example, each of the light-emitting diode arrays can output light 613 at different times as each other. For example, some of the light-emitting diode arrays can output light 613 at different times as each other, while other light-emitting diode arrays can output light 613 at the same time as others.

The light emitters 612 can have a viewing angle (e.g., an angular range outward from the light emitters 612 over which the outputted light 613 has at least a threshold fraction of brightness (or power) of a total potential brightness of the outputted light 613). The first optic 614 can be positioned in the viewing angle of the light emitters 612.

The one or more light emitters 612 of the sensor 610 can output light 613 that has a second wavelength. The second wavelength of the light 613 output by the one or more light emitters 612 can be the same as or different than the first wavelength of the beam 542 output by the one or more scanning optics 532. By outputting the light 613 at the second wavelength different than the first wavelength of the beam 542, the sensor 610 can reduce or eliminate interference between the light 613 and the beam 542. For example, the first wavelength of the beam 542 output by the one or more scanning optics 532 of the LIDAR system 500 can be about 1510 nm and the second wavelength of the light 613 output by the one or more light emitters 612 can be about 940 nm.

The second wavelength of the light 613 output by the one or more light emitters 612 can be of various wavelengths. For example, the second wavelength of the light 613 output by the one or more light emitters 612 can be greater than or equal to about 400 nm and less than or equal to about 1500 nm. For example, the second wavelength of the light 613 output by the one or more light emitters 612 can be greater than or equal to about 400 nm and less than or equal to about 750 nm. For example, the second wavelength of the light 613 output by the one or more light emitters 612 can be greater than or equal to about 1 nm and less than or equal to about 400 nm. For example, the second wavelength of the light 613 output by the one or more light emitters 612 can be greater than or equal to about 750 nm and less than or equal to about 2,500 nm. For example, the second wavelength of the light 613 output by the one or more light emitters 612 can be greater than or equal to about 2500 nm and less than or equal to about 25 micrometers (μm).

The LIDAR system 500 can also operate in a manner in which the light emitters 612 output the light 613 based on time such that interference with the beam 542 is avoided, while the first wavelength of the beam 542 output by the one or more scanning optics 532 is about equal to the second wavelength of the light 613 output by the one or more light emitters 612. For example, the light emitters 612 can pulse the light 613 (e.g., output pulses on a periodic basis, such as every two seconds) to avoid interference with beam 542, which can be output in a pulsing manner that does not overlap with the light 613 output by the light emitters 612. For example, the at least one parameter of the light 613 and beam 542 can be a time parameter, and the light emitter 612 can output the light 613 during a period of time in which the beam 542 is not outputted, such as to not coincide in time with the beam 542 passing through the window 601 (e.g., is not expected to be passing through the window 601).

The one or more light emitters 612 can include or be coupled with at least one bandpass filter, which can selectively allow light of a particular wavelength (or wavelength range) to be provided from the light emitters 612 to the first optic 614. The detector 618, discussed in more detail below, can also include or be coupled with at least one bandpass filter, which can be configured to provide light to the detector 618 of the same wavelength (or wavelength range) as the bandpass filter of the light emitters 612.

The sensor 610 can include at least one second optic 616. The second optic 616 can be similar or identical to the first optic 614. For example, the second optic 616 can be a light coupling element, such as a prism. The second optic 616 can be coupled to the second end 628 by epoxy (e.g., index-matching epoxy). As such, the optics 614, 616 can be bonded to the window 601 on either side of where beams 542, 548 are passed through the window 601. One or more of the at least one first optic 614 or the at least one second optic 616 can be components other than coupling prisms. For example, the first or second optics 614, 616 can be optical coating layers. The first or second optics 614, 616 can be an optical grating on the window 601.

The second optic 616 can receive light 619 from the window 601. In a manner similar to that by which the light 613 is coupled into the window 601 due to the first optic 614 being arranged so that the light 613 has a greater angle (first angle of incidence 622) than the particular angle of the window 601, the light 619 can have a second angle of incidence 624, defined between a line orthogonal to the window surface 620 and a direction of the light 619. For example, the second angle of incidence 624 can be based on the arrangement of the second optic 616 relative to the window 601 to allow for the light 619 to escape total internal reflection within the window 601.

Both the first and second angle of incidences 622 and 624 can be greater than the particular angle of the window 601. For example, the window 601 can have a particular angle of about 42 degrees and the first and second angle of incidences 622 and 624 can be about 60 degrees. The first and second angle of incidences 622 and 624 can be equal. For example, the first and second angle of incidences 622 and 624 can both be about 50 degrees to about 60 degrees. The first and second angle of incidences 622 and 624 can be unequal. For example, the first angle of incidence 622 can be about 50 degrees and the second angle of incidence 624 can be about 60 degrees.

The first optic 614 can have a first index of refraction. The second optic 616 can have a second index of refraction. The window 601 can have a third index of refraction. The first index of refraction of the first optic 614, the second index of refraction of the second optic 616, and the third index of refraction of the window 601 can be about equal.

At least one of the first optic 614 of the second optic 616 can have a respective light blocker 632, 634. The light blockers 632, 634 can be a structure that is not transmissive to the beams 542, 548, such as to prevent light not emitted by the light emitters 612 (or the LIDAR system 500) from coupling with the window 601.

The sensor 600 can include at least one detector 618. The detector 618 can include one or more detector elements (e.g., detector elements 808 described with reference to FIG. 8), such as one or more light sensors, such as one or more photodiodes. For example, the detector 618 can include an array of photodiodes. The detector 618 can receive the light 619 that is coupled out of the window 601 by the second optic 616. The detector 618 (e.g., each detector element 808 of the detector 618) can convert received light 619 to one or more corresponding electrical signals, which can have a characteristic, such as voltage, indicative of the light 619, such as a power, brightness, or intensity of the light 619.

The detector 618 can have a viewing angle. The viewing angle can be an angle range over which the detector 618, such as a photodiode array of the detector 618, is able to detect at least a threshold brightness or power of light incident on the detector 618. The second optic 616 can be within the viewing angle of the detector 618, such that the detector 618 can receive the light 619 coupled out of the window 601 by the second optic 616. For example, the light 619 may escape total internal reflection due to the second optic 616 being adjacent to the window 601, exit the window 601 through the second optic 616, and irradiate the detector 618 (e.g., irradiate one or more photodiodes of the detector 618).

The detector 618 can generate a signal based on the light 619. The signal can have, for example, a voltage or other characteristic representative of the light 619, such as a power of the light 619, due to interaction of the light 619 with the detector 618.

The detector 618 can detect an indication of an obscurant using the light 619. For example, the detector 618 can detect the indication of the obscurant based at least on a signal associated with the light 613 and the signal generated based on the light 619. The signal associated with the light 613 can be received from the light emitters 612, or can be a predefined value stored by the detector 618, such as a value indicative of an expected power of the light outputted by the light emitters 612. For example, the signal associated with the light 613 can correspond to a previously measured value of the power of the light outputted by the light emitters 612. The signal associated with the output light 613 can be an amount of voltage converted into light 613 that the light emitters 612 output (e.g., based on power from a power supply). The signal generated based on the light 619 can be an amount of voltage converted from light 619 that is received by the detector 618.

The detector 618 (e.g., using one or more processors; using a comparator circuit) can compare the signal associated with the light 613 with the signal generated with the light 619 to detect the indication of the obscurant. For example, the detector 618 can determine an obscurant to be present responsive to a difference between the signal associated with the light 613 with the signal generated with the light 619 being greater than a threshold difference.

In some implementations, in the presence of an obscurant, the signal associated with the light 619 can be less than the signal associated with the output light 613. For example, obscurants that are transmissive to the light 613 can couple the light 613 out of the window 601 before the light 613 reaches the second optic 616, and obscurants can absorb light 613 before the light 613 reaches the second optic 616, each resulting in the power of the light 619 being less than that of the light 613. The detector 618 can determine a difference between the signal associated with the output light 613 and the signal associated with the received light 619, evaluate the difference using a threshold condition, and detect the indication of the obscurant responsive to the difference satisfying the threshold condition (e.g., by determining that the difference is greater than a minimum threshold). The threshold condition, such as the minimum threshold, can be determined from calibration of the detector 618. For example, the calibration can be based on a voltage outputted by the detector 618 during operation of the sensor 610 with a clean window 601. The threshold value can be systematically less than the voltage output of a clean window 601.

Responsive to detecting (or not detecting) the presence of the obscurant, the detector 618 can output a detection signal, such as an obscurant alert. The detection signal can include the indication, to provide output as to whether the obscurant is detected. The detector 618 can provide the detection signal to various other components, such as a remote device to display the indication, a cleaning system (e.g., wiper) to cause the cleaning system to clean the window 601, the vehicle controller 598, or various combinations thereof.

The sensor 610 can have a detection time, such as a minimum time for the detector 618 to detect the presence of the an obscurant. The detection time can correspond to factors such as the speed of light travelling through the optics 614, 616 and the window 601, and dimensions of the optics 614, 616 and the window 601. For example, the detection time can correspond to a duration of time for the light emitters 612 to output light 613, which is coupled into the window 601 at the first end 626; the light to travel to the second end 628 of the window 601, where it is coupled out of the window 601 and received by the detector 618; and the detector 618 to compare and detect a difference between the signal associated with the light 613 and the signal associated with the light 619. For example, the detection time of the sensor 610 can be greater than or equal to about 80 milliseconds and less than or equal to about 120 milliseconds.

Figure 7:
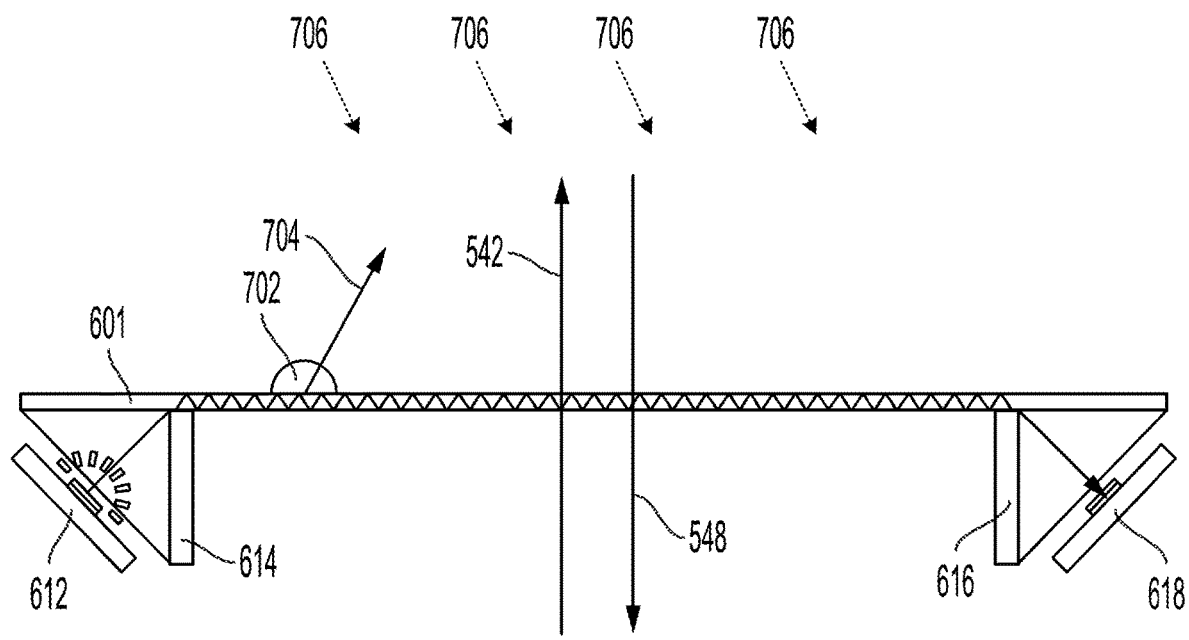
FIG. 7 is a schematic diagram of an example of the sensor of FIG. 6 in a use case.

FIG. 7 is a schematic diagram of an example of the sensor 610 of FIG. 6 in a use case, according to some implementations. FIG. 7 shows an example of an obscurant 702 on the window 601 of the LIDAR system 500, which causes at least some light 704 to be coupled out of the window 601 at the location of the obscurant 702, rather than continuing to undergo total internal reflection as the light (e.g., light 613) travels from the first optic 614 to the second optic 616. As described with respect to FIG. 6, the sensor 610 can detect the presence of the obscurant 702 based at least on a signal corresponding to light outputted by light emitters 612 and a signal corresponding to light received by detector 618, such as by comparing voltages of the signals. For example, the voltage of the signal corresponding to light received by the detector 618 may be less than the voltage of the signal corresponding to light outputted by the light emitters 612 by at least a threshold value, due to at least some light being coupled out of the window 601 by the obscurant 702.

As depicted in FIG. 7, there can be stray light, such as ambient light 706, from outside the weatherized enclosure that includes the window 601. The ambient light 706 can interferes with the signal associated with the light received by the detector 618. For example, the ambient light 706 can couple into the window 601, which can increase the light received by the detector 618 and thus influence the amount of voltage detected by the detector 618. As described below with reference to FIG. 8, the sensor 610 can facilitate signal modulation and lock-in detection, to enable the sensor 610 to differentiate between ambient light 706 and the light outputted by the light emitters 612.

Figure 8:
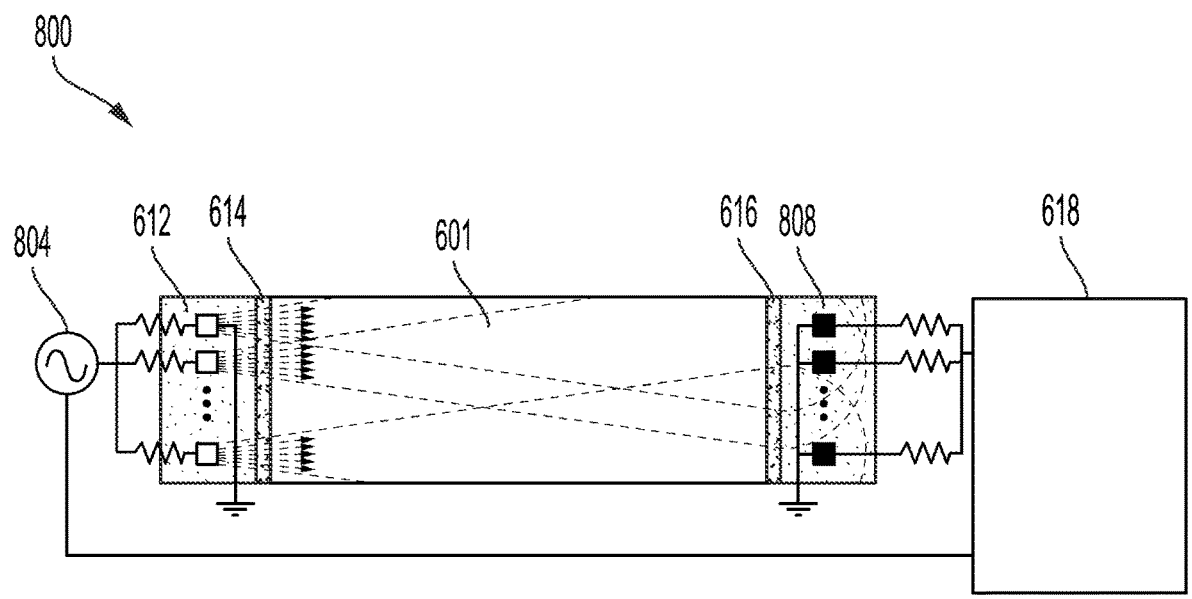
FIG. 8 is a block diagram of an example of components of the sensor of FIG. 6.

FIG. 8 is a block diagram of an example of a detector system 800 that can operate with or as part of the sensor 610, according to some implementations. The detector system 800 can include the detector 618.

The detector system 800 can include a signal modulator 804. The signal modulator 804 can perform signal modulation. The signal modulator 804 can encode a signal, such as the signal associated with the output light 613. The signal modulator 804 can impose a signal, such as the signal associated with the output light 613, onto a wave that has one or more predetermined parameters, resulting in a modulated wave. The wave that has one or more predetermined parameters can be characterized as a carrier wave. For example, the carrier wave can be a sine wave or a square wave. The carrier wave can have a constant, or near constant, frequency. The signal modulator 804 can impose a wave with predetermined parameters (i.e., a carrier wave) onto a signal, such as the signal associated with the output light 613, resulting in a modulated wave. The modulated wave can have a signal modulation frequency. For example, the signal modulator 804 can add a carrier wave to the one or more electrical signals before the one or more light emitters 612 convert the one or more electrical signals to light 613. The signal modulation can be used to perform lock in detection, discussed in more detail below. Due to the signal modulation, the light 613 coupled into the window 601 can have a frequency range different than that of stray light, background light, or electrical signals at a frequency different than the signal modulation frequency. Due to the lock-in detection, the sensor 610 can determine the amount of light lost without including the ambient light 706 signals or electrical signals not at the signal modulation frequency.

The sensor 610 can have a number of detector elements 808 corresponding to the size of the window 601 of the LIDAR system 500. For example, the detector elements 808 can be spaced along the second optic 616 relative to the second end 628 of the window 601 such that all of the light 619 that is coupled out of the window 601 is received by a respective detector element 808.

The detector 618 can process the one or more electrical signals provided by the one or more detector elements 808. The detector 618 can include a voltage summer. For example, the voltage summer of the detector 618 can sum the voltages of the one or more electrical signals provided by the one or more detector elements 808 (e.g., by one or more photodiodes) to generate the signal associated with the light 619 received by the detector 618. The detector 618 can include a lock-in detector (e.g., lock-in amplifier). The detector 618 can use the lock-in detector to selectively extract signals generated based on the received light 619 (e.g., to filter out signals generated from other light) using the signal associated with the light 613. The detector 618 can perform lock in detection using digital signal processing, analog circuits, or various combinations thereof.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A light detection and ranging (LIDAR) sensor system, comprising:
 a window;
 a first light emitter comprising a laser source configured to emit a laser beam of a first wavelength;
 one or more scanning optics configured to output the laser beam through the window; and
 a sensor, comprising:
  a second light emitter configured to output a sensor beam having a second wavelength different than the first wavelength;
  a first optic coupled to the window, the first optic configured to receive the sensor beam from the second light emitter and direct the sensor beam into the window at a particular angle relative to a surface of the window such that the sensor beam undergoes total internal reflection in the window, wherein the particular angle is determined based at least in part on an index of refraction of the window;
  a second optic coupled to the window, the second optic configured to receive the sensor beam directed into the window by the first optic; and
  a detector configured to receive the sensor beam from the second optic and to output a signal indicative of a presence of an obscurant on the window based on the sensor beam received from the second optic.

2. The LIDAR sensor system of claim 1, wherein the detector is configured to generate the signal to indicate the presence of the obscurant based on a power of the sensor beam received by the detector.

3. The LIDAR sensor system of claim 1, wherein the particular angle is between about 40 degrees and about 45 degrees.

4. The LIDAR sensor system of claim 1, wherein the second light emitter is configured to output the sensor beam outside of a period of time in which the laser beam from the laser source passes through the window.

5. The LIDAR sensor system of claim 1, comprising a receiver configured to receive the laser beam that has passed through the window.

6. The LIDAR sensor system of claim 1, wherein the second wavelength of the sensor beam is greater than or equal to about 400 nanometers (nm) and less than or equal to about 1500 nm.

7. The LIDAR sensor system of claim 1, further comprising a first epoxy portion between the first optic and the window and a second epoxy portion between the second optic and the window, wherein the first epoxy portion and the second epoxy portion have a particular index of refraction about equal to that of the first optic, the second optic, and the window.

8. The LIDAR sensor system of claim 1, further comprising a modulator configured to modulate a phase or an amplitude of the sensor beam.

9. The LIDAR sensor system of claim 8, wherein the detector is configured to generate the signal indicative of the presence of the obscurant based on the modulation of the sensor beam and the sensor beam received from the second optic.

10. The LIDAR sensor system of claim 1, wherein at least one of the first optic or the second optic comprises a prism.

11. The LIDAR sensor system of claim 1, wherein the detector comprises a photodiode array.

12. The LIDAR sensor system of claim 1, wherein the second light emitter and the first optic are configured to provide the sensor beam into the window to span a cross-section of the window.

13. The LIDAR sensor system of claim 1, further comprising one or more processors configured to receive the signal from the detector and generate an obscurant alert responsive to receiving the signal.

14. An autonomous vehicle, comprising:
a LIDAR sensor system, comprising:
    a window;
    a first light emitter comprising a laser source configured to generate a beam of a first wavelength;
    one or more scanning optics configured to output the laser beam through the window; and
    one or more processors configured to determine at least one of a range to an object or a velocity of the object based on reflection of the beam by the object;
a sensor, comprising:
    a second light emitter configured to output a sensor beam of a second wavelength different than the first wavelength;
    a first optic coupled to the window, the first optic configured to receive the sensor beam from the second light emitter and direct the sensor beam into the window at a particular angle relative to a surface of the window such that the sensor beam undergoes total internal reflection in the window, wherein the particular angle is determined based at least in part on an index of refraction of the window;
    a second optic coupled to the window, the second optic configured to receive the sensor beam directed into the window by the first optic; and
    a detector configured to receive the sensor beam from the second optic and output a signal indicative of a presence of an obscurant on the window based on the sensor beam received from the second optic;
a steering system;
a braking system; and
a vehicle controller configured to control operation of at least one of the steering system or the braking system based on the at least one of the range or the velocity.

15. The autonomous vehicle of claim 14, wherein the second wavelength of the sensor beam is greater than or equal to about 400 nanometers (nm) and less than or equal to about 1500 nm.

16. An autonomous vehicle control system, comprising:
a LIDAR sensor system, comprising:
    a window;
    a first light emitter comprising a laser source configured to generate a laser beam of a first wavelength;
    one or more scanning optics configured to output the laser beam through the window; and
    one or more processors configured to determine at least one of a range to an object or a velocity of the object based on reflection of the beam by the object;
a sensor, comprising:
    a second light emitter configured to output a sensor beam of a second wavelength different than the first wavelength;
    a first optic coupled to the window, the first optic configured to receive the sensor beam from the second light emitter and direct the sensor beam into the window at a particular angle relative to a surface of the window such that the sensor beam undergoes total internal reflection in the window, wherein the particular angle is determined based at least in part on an index of refraction of the window;
    a second optic coupled to the window, the second optic configured to receive the sensor beam directed into the window by the first optic; and
    a detector configured to receive the sensor beam from the second optic and to output a signal indicative of a presence of an obscurant on the window based on the sensor beam received from the second optic;
the one or more processors of the LIDAR sensor system configured to control operation of at least one of a steering system of an autonomous vehicle or a braking system of the autonomous vehicle based on the at least one of the range or the velocity.

17. The autonomous vehicle control system of claim 16, wherein the detector is configured to generate the signal to indicate the presence of the obscurant when a power of the sensor beam received by the detector is less than a threshold power.

18. The autonomous vehicle control system of claim 16, wherein the second wavelength of the light is greater than or equal to about 400 nanometers (nm) and less than or equal to about 1500 nm.

19. The autonomous vehicle control system of claim 16, comprising an epoxy between the first optic and the window and between the second optic and the window, the epoxy having an index of refraction about equal to that of the first optic, the second optic, and the window.

20. The autonomous vehicle control system of claim 16, comprising one or more processors configured to receive the signal from the detector and generate an obscurant alert responsive to receiving the signal.

* * * * *